United States Patent [19]

Heynen

[11] 3,864,528

[45] Feb. 4, 1975

[54] FAULT LOCATING SYSTEM FOR A DIGITAL TRANSMISSION SYSTEM

[75] Inventor: Jan Heynen, Ottawa, Ontario, Canada

[73] Assignee: Bell-Northern Research Ltd., Ottawa, Ontario, Canada

[22] Filed: Aug. 22, 1973

[21] Appl. No.: 390,426

[52] U.S. Cl. .................. 179/175.31 R

[51] Int. Cl. .................. H04b 1/60, H04b 3/46

[58] Field of Search .......... 179/175.31 R; 178/70 R, 178/69 G; 340/147 G, 171 R, 160

[56] References Cited

UNITED STATES PATENTS

| | | | |
|---|---|---|---|
| 2,414,123 | 1/1947 | Retallack | 340/160 |
| 3,083,270 | 3/1963 | Mayo | 179/175.31 R |
| 3,651,284 | 3/1972 | Maione | 179/175.31 R |
| 3,770,913 | 11/1973 | Camiciottoli et al. | 179/175.31 R |

*Primary Examiner*—Thomas A. Robinson
*Attorney, Agent, or Firm*—John E. Mowle

[57] ABSTRACT

A system for testing line repeaters in a digital transmission system in which a limited number of test signal frequencies are available. By providing switched amplifiers appending each of the line repeaters which are responsive to a powering voltage of a selective magnitude and polarity, quadruple the number of line repeaters can be tested using a single test line.

3 Claims, 1 Drawing Figure

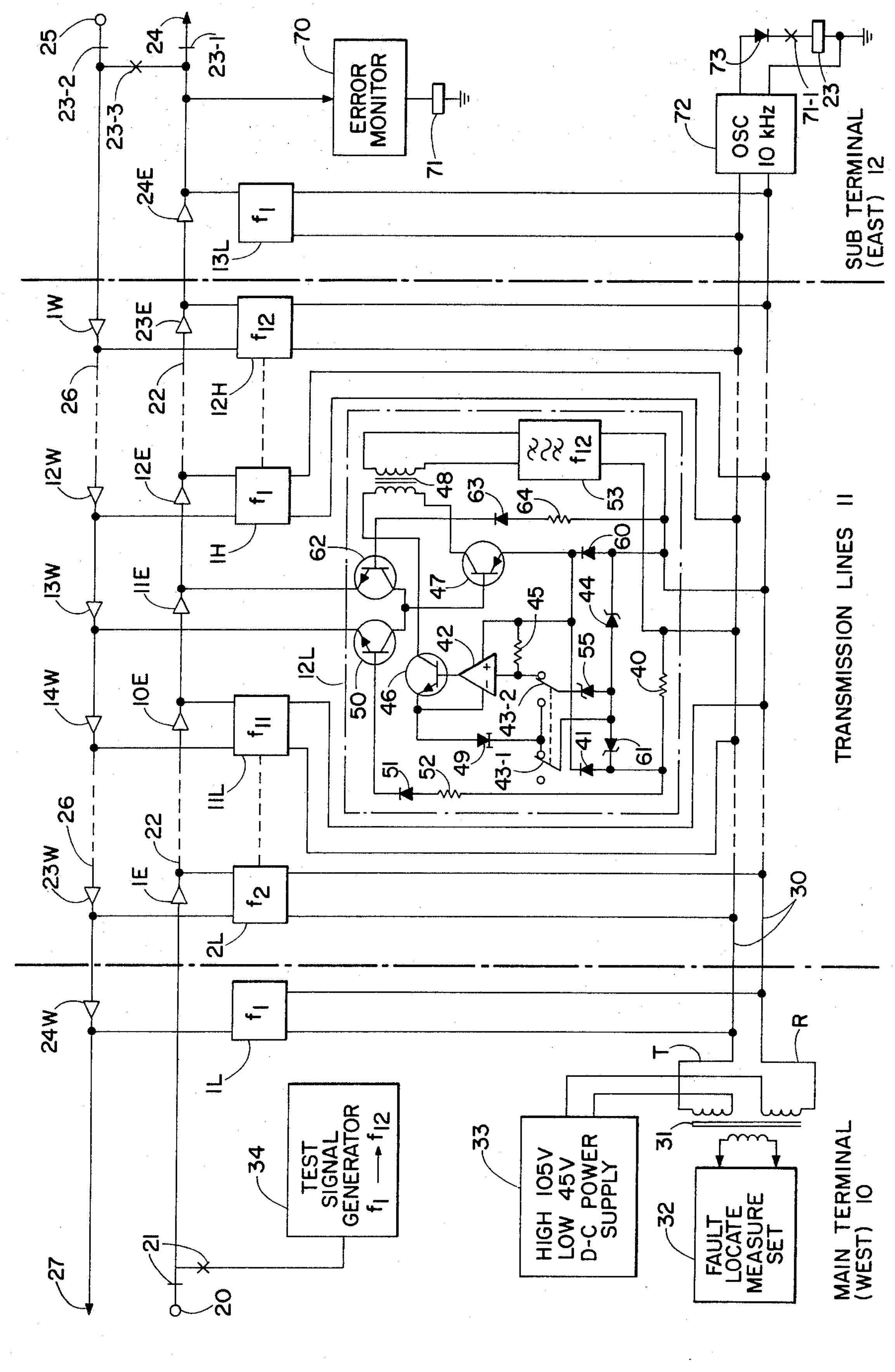
ERROR MONITOR
OSC 10 kHz
SUB TERMINAL (EAST) 12
TRANSMISSION LINES 11
MAIN TERMINAL (WEST) 10
TEST SIGNAL GENERATOR $f_1 \longrightarrow f_{12}$
HIGH 105V LOW 45V D-C POWER SUPPLY
FAULT LOCATE MEASURE SET

FAULT LOCATING SYSTEM FOR A DIGITAL TRANSMISSION SYSTEM

BACKGROUND OF THE INVENTION

This invention relates to a system for locating faults in line repeaters of a digital transmission system and more particularly to one which utilizes a common fault locate line powered by various amplitude and polarity combinations to selectively monitor the output of one of the line repeaters.

Digital transmission systems are now widely used as a means for conveying both analog speech signals and data signals between terminals over a carrier system. One such system utilizing pulse code modulation (PCM) techniques has been developed in the United States of America by Bell Telephone Laboratories under the designation T1 Carrier Transmission System. This system has 24 speech channels which are transmitted by PCM over a single pair of wires at a pulse repetition rate of 1.544 MHz. In order to compensate for attenuation along the transmission line, line repeaters are inserted at about 6,000 ft. intervals, while bipolar transmission is generally employed to cancel the d-c component on the transmission line.

A fault locating system for such a bipolar transmission system is described in U.S. Pat. No. 3,083,270 entitled "Pulse Repeater Marginal Testing System" invented by John S. Mayo and issued Mar. 26, 1963. By inserting a selected number of unipolar pulses into the bipolar pulse train at a recurrent audio rate, a variable d-c component is developed. The audio output level of this component depends on the density of the bipolar violations. Consequently, a measure of the density of the bipolar violations. Consequently, a measure of the performance of each line repeater can be obtained from the number of these bipolar violations which can be reproduced faithfully. To detect which line repeater is at fault, the output of each repeater is fed through a bandpass filter tuned to a unique frequency. Each of the filters is connected to a common fault locate line which monitors the performance at one terminal of the system. It can be shown that a marginal repeater will always reduce the number of bipolar violations. Hence, when step-by-step, the density of the bipolar violations in the test signal is increased, at a certain point (depending on the quality of the line repeater under test) the filter output will not increase as much as would be expected.

Mayo also states, in an article titled: "A Bipolar Repeater for Pulse Code Modulation Signals," The Bell System Technical Journal; January 1962, pp 25 to 97 at pp 78 to 82, that there are a maximum of 17 unique fault locating frequencies in the band between 1.005 and 3.017 KHz which can be used for testing in the T1 Carrier System. In practice, a maximum of 12 of the 17 frequencies are used on each fault locate line. In prior systems with longer spans, the frequencies are duplicated with the filter outputs being connected to separate fault locate lines.

Thus the disadvantage of the prior systems is that a maximum number of 17 filters, in practice 12 filters, can be connected to any one common fault locate line. It is therefore advantageous to provide a system in which additional filters of the same frequency are connected to a common fault locate line and to provide some means for uniquely selecting the output of each filter.

STATEMENT OF THE INVENTION

By providing at each location a fault locate filter circuit which is only responsive to a powering voltage either greater than or less than a particular magnitude, the number of filters connected to each fault locate line can be doubled.

Thus, in accordance with the present invention there is provided a fault locating system, for a digital transmission system which includes a plurality of line repeaters serially connected along a transmission line. The fault locating system comprises a frequency selective filter circuit connected to the output of each of the line repeaters for monitoring the performance thereof. The circuits are divided into two groups which are responsive to corresponding test frequencies, each of the frequencies being unique within a group. Also provided is a generator for transmitting a test signal along the transmission line at one of the test frequencies. A common fault locate line is connected to the signal output of each filter circuit. Power is coupled to the circuits from the common fault locate line. In addition, each frequency selective filter circuit includes a control means to actuate the circuits in one group only when the powering voltage is below a selected value and to actuate the circuits in the other group only when the powering voltage is above a selected value, so that a signal from a unique one of the line repeaters is coupled to the common fault locate line.

In an alternate embodiment, a second transmission line parallels the first and also includes line repeaters at the same locations as those in the first transmission line. The frequency selective circuit at each location is also connected to the output of the line repeaters in the second transmission line. In addition, means is provided for selecting the output of one or the other of the two line repeaters connected to it in response to the d-c polarity of the powering voltage connected to the common fault locate line. With this arrangement, quadruple the number of line repeaters can be connected to a single fault locate line.

Thus, to facilitate fault locating in transmission lines with more than the maximum allotted number of line repeaters using a single fault locate line, the frequency selective filters are equipped with switched amplifiers. The amplifiers are powered via the fault locate line such that if the powering voltage is less than a selected value, one group of filters responds while if the powering voltage is greater than that value, the other group of filters responds. The two groups of filters use identical frequencies. In addition, the amplifiers improve the signal-to-noise ratio of the return signal for longer test loops in the system.

In addition to the powering voltage level, the powering voltage polarity may also serve to provide a selection function. The switched amplifiers have two inputs. One input operates for one powering polarity while the other for the opposite polarity. Line repeaters on the incoming transmission line are actuated by voltage of one polarity while line repeaters on the outgoing transmission line are actuated by powering voltages of the opposite polarity.

In a preferred embodiment, this feature is used in conjunction with looping facilities at a distant terminal. A performance monitor is provided to detect the absence of pulses and/or excessive numbers of bipolar violations at the far terminal. When power of any level and polarity is applied simultaneously to the fault locate line at the main terminal, the distant sub-terminal detects the presence of both and returns the output of one transmission line at the sub-terminal back to the main terminal via the other transmission line.

This looping feature can be used in two different ways. If it is required to check the incoming transmission line to the main terminal when a fault is detected, a test signal may be applied to the outgoing transmission line that is associated with the failed incoming line. This test signal will activate the performance monitor in the sub-terminal due to the bipolar violations. Powering of the fault line will then loop the test signal back into the failed line.

When fault locating is done on outgoing transmission lines, no indication is available to determine at the near end terminal what line has failed. This can be determined by powering the fault locate line. Since the outgoing line will register a complete loss of signal or an excessive number of bipolar violations, it will be looped back through the subterminal through an incoming transmission line, and register at the main terminal.

BRIEF DESCRIPTION OF THE DRAWING

An example embodiment of the invention will now be described with reference to the accompanying drawing which illustrates a fault locating system for a two-way digital transmission system.

DESCRIPTION OF THE PREFERRED EMBODIMENT

Referring to the single figure, the fault locating system in conjunction with a digital transmission system generally comprises a main terminal (west) 10, connected by two unidirectional transmission lines 11 to a subterminal (east) 12. The detailed structure of the fault locating system will be better understood by reference to the following description of its function and operation. In the following description, relays and switches will be identified by a base reference numeral with their associated contacts being designated by additional dashed numbers.

During normal operation, a bipolar PCM signal of the T1 format is coupled from an input terminal 20 through the break portion of transfer contacts 21 to the output of the main terminal 10. From there, the PCM signal is coupled to an easterly-going transmission line 22 which includes 24 serially connected line repeaters consecutively designated 1E, 2E, 3E . . . 23E and 24E (some of which are not shown), which would in a practical application be located at about 6,000 ft. intervals along a two-wire telephone line. The output of the last line repeater 24E which is located in the easterly subterminal 12 is connected through break contacts 23–1 to an output terminal 24. Conversely, a bipolar PCM input signal at the easterly subterminal 12 is coupled from an input terminal 25 through break contacts 23–2 to the output of the subterminal 12. This output is connected to a westerly-going transmission line 26 which also includes 24 serially connected line repeaters 1W, 2W, 3W . . . 23W and 24W (again only some of which are shown). The output of the last line repeater 24W which is located in the westerly main terminal 10 is connected to an output terminal 27.

Except at the end terminals 10 and 12, the line repeaters 1E to 23E and 1W to 23W are located in pairs; e.g. repeater 1E is paired with 23W, and repeater 11E is paired with 13W. At the terminals 10 and 12, the line repeaters 24W and 24E are connected in series with the incoming portions of the transmission lines 26 and 22 respectively. No line repeaters are necessary on the outgoing portions of the lines 22 and 26. At each location, the repeaters or pairs of repeaters 1E to 24E and 1W to 24W are connected to either a low voltage powered frequency selective filter circuit 1L, 2L . . . 12L or 13L; or a high voltage powered frequency selective filter circuit 1H, 2H . . . 11H or 12H. All the frequency selective filter circuits 1L . . . 12H are basically the same and consequently only the filter circuit 12L is shown in detailed block and schematic form.

In addition, the outputs of each of the frequency selective filter circuits 1L . . . 12H are connected to a common fault locate line 30 which in practice comprises a single telephone pair having T (Tip) and R (Ring) leads. At the main terminal 10, the end of the common fault locate line 30 is connected to the primary of a transformer 31 the secondary of which is connected to a fault locate measure set 32. During testing power is applied to the common fault locate line 30 from a d-c power supply 33 in the main terminal 10, which is capable of providing a high voltage (105 volts) or a low voltage (45 volts) of either polarity to the T and R leads.

Also, a test signal generator 34 is coupled to the transmission line 22 by actuation of the transfer contacts 21. The test signal generator 34 applies a bipolar signal having superimposed thereon groups of one or more unipolar pulses at recurrent intervals, so as to generate a low frequency component at one of 12 audio frequencies $f_1$ to $f_{12}$. Each of the frequency selective filter circuits 1L . . . 12H is responsive to only one of the 12 audio frequencies $f_1$ to $f_{12}$. When the test signal from the generator 34 is being looped back through the subterminal 12, the outputs of all 48 line repeater 1E to 24E and 1W to 24W are coupled to the 25 line filter circuits 1L to 13L and 1H to 12H whose outputs in turn are connected to the common fault locate line 30. Since only 12 test frequencies are used, further selection is achieved within each frequency selective filter circuit 1L to 12H by making each responsive only to a powering voltage on the common fault locate line 30 of a particular magnitude and polarity.

As mentioned above, each of the 25 frequency selective filter circuits 1L . . . 12H are basically the same and are exemplified by the low voltage powered filter circuit 12L. The circuitry within the block 12L is somewhat simplified with only those components being illustrated which are necessary for a clear understanding of its operation. This circuit 12L will first be described in its normal operating modes which, except for the operating frequency of the filter contained therein, are identical to those of the filter circuits 1L, 2L . . . 13L. The circuit 12L will then be described as operating in a high voltage mode which is basically identical to that of the filter circuits 1H . . . 12H. High voltage operation occurs when the d-c voltage applied to the common fault locate line 30 from the power supply 33 is greater than 65V while low voltage operation is during the interval when the power supply voltage is less than 51V.

With 45V applied to the common fault locate line 30 from the d-c power supply 33 with positive on the T lead, the following current paths are established through the filter circuit 12L. From the T lead, through a current limiting resistor 40, a diode 41, across a control amplifier 42, a current regulator diode 49, break contacts 43–1 of a double-pole double-throw switch, a forward biased Zener diode 44 to the R lead. A resistor 45 couples a positive voltage to the input of the amplifier 42 which in turn forward biases a control transistor 46 so as to establish the following current path through the filter circuit 12L. From the diode 41, through an output transistor 47, the primary of a transformer 48, the control transistor 46, the current regulator diode 49, back through the contacts 43–1. Concurrently, the positive voltage on the T lead forward biases the base-emitter junction of an input transistor 50 via a series connected diode 51 and a resistor 52, one end of which is coupled to the resistor 40. This couples the signal output of the line repeater 13W to the output transistor 47 which in turn is coupled to the transformer 48, the secondary of which is coupled to a band-pass filter 53. The output of the filter 53 is connected across the common fault locate line 30.

If during this configuration a high operating voltage of +105V were applied between the T and R leads, a further conduction path would be established from the diode 41 through the resistor 45, break contacts 43–2, a 51V Zener diode 55 operating in its Zener region, the Zener diode 44 to th R lead. Conduction of the Zener diode 55 applies a negative-going voltage to the amplifier 42 which in turn shuts off the control transistor 46 thereby disabling the output transistor 47.

If 45V is now applied to the common fault locate line 30 with the R lead positive, the following current paths will be established through the circuit 12L. From the R lead, through a diode 60, the amplifier 42, the break contacts 43–1, a forward biased Zener diode 61, the current limiting resistor 40 to the T lead. Again, the positive-going voltage applied through the resistor 45 to the amplifier 42, will forward bias the control transistor 46. This in turn establishes a second path from the diode 60 through the output transistor 47, the primary of the transformer 48, the control transistor 46, the break contacts 43–1, the forward biased Zener diode 61 and the resistor 40 to the T lead. In addition, the positive voltage on the R lead forward biases an input transistor 62 through the series connected diode 63 and a resistor 64 which in turn couples the signal output of the line repeater 11E to the base of the output transistor 47.

If, during this configuration, the powering voltage applied to the common fault locate line 30 rises above 51V, the Zener diode 55 will again commence to conduct which in turn applies a negative-going voltage through the amplifier 42 to the control transistor 46 thereby disabling the output transistor 47 in a manner similar to that discussed above.

To operate the filter circuit 12L in response to the application of a high powering voltage (greater than 51V) the double-pole double-throw switch is actuated thereby opening its break contacts 43–1 and transferring its break-make contacts 43–2. The circuit configuration is then the same as that of the filter circuits 1H . . . 12H. With 105V applied to the line 30 from the supply 33 and a positve voltage on the T lead, the current paths will be identical to those in the first description above with the exception that the current through the amplifier 42 and the transistor 46 will pass through the make contacts 43–2 and the 51V Zener diode 55 rather than through the contacts 43–1. If the voltage applied between the T and R leads drops below 51V, the Zener diode 55 will stop conducting thereby disabling power applied to the amplifier 51 and the control transistor 46 which in turn disables the output transistor 47.

Operation of the circuit 12L in its alternate high voltage configuration with 105V applied to the line 30 and a positive voltage on the R lead, is similar to the low voltage configuration with a positive voltage on the R lead. Again, the difference is that current from the amplifier 42 and the transistor 46 will pass through the contacts 43–2 and the Zener diode 55. Also, if the voltage applied between the T and R leads drops below 51V, the Zener diode 55 will stop conducting thereby disabling power applied to the output transistor 47 as explained previously.

To summarize, each of the filters 1L . . . 13L is conditioned to operate only when a low d-c powering voltage of less than 51V is applied to the common fault locate line 30 from the power supply 33. When the T lead is positive, the output of the line repeaters 24W . . . 13W will be connected to the frequency selective filter circuits 1L . . . 12L respectively. Conversely, when the R lead is positive the output of the line repeaters 1E . . . 11E and 24E will be connected to the line repeaters 2L . . . 13L respectively. Application of a high powering voltage greater than 51V to the filters 1L . . . 13L will disable power to the output transistor 47 due to the disabling of the control transistor 46. On the other hand, when a high powering voltage greater than 65V is applied to the line 30 from the power supply 33, the frequency selective filter circuits 1H . . . 12H will be conditioned. When the T lead is positive, the outputs of the line repeaters 1W . . . 12W will be connected to the filter circuits 12H . . . 1H respectively. Conversely, when the R lead is positive, the outputs of the line repeaters 12E . . . 23E will be connected to the filter circuits 1H . . . 12H respectively. Under these operating conditions, when the voltage from the power supply 33 drops below 51V, the Zener diode 55 will cease conducting thereby disabling the output transistor 47. It will be observed that both filter circuits 1L and 13L have only one input rather than two. The filter circuit 1L operates when 45V is applied to the line 30 with positive on the T lead, while the filter circuit 13L operates when 45V is applied to the line 30 with positive on the R lead. The current regulator diode 49 limits the current drawn from the fault locate line 30 to approximately 0.5mA independent of the exact powering voltage available across the terminals from the line 30. This insures equal distribution of power to the filter circuits 1L . . . 12H where long lines are used. The back-to-back Zener diodes 44 and 61 in conjunction with the current limiting resistor 40 provide surge protection for each of the filter circuits 1L . . . 12H in a conventional manner.

A failure of the westerly going transmission line 26 can be determined by either a complete loss of the incoming bipolar signal or by the number of bipolar violations being received at the main terminal 10. In order to ascertain which of the line repeaters 1W . . . 24W is at fault, signals from the test signal generator 34 are applied to the easterly-going transmission line 22 by actuation of the transfer contacts 21. At the subterminal 12, an error monitor 70 detects the bipolar violations from the test signal generator 34 and actuates a relay 71 which closes make contacts 71–1. Application of either a high or low voltage from the power supply 33 to the common fault locate line 30 triggers a 10 KHz oscillator 72 the output of which is rectified by a diode 73 in series with the make contacts 71–1 to actuate relay coil 23. This in turn actuates the contacts 23–1, 23–2 and 23–3 to divert the incoming signal on the transmission line 22 back to the transmission line 26.

Alternately, failure of the easterly-going transmission line 22 can be determined by applying power of either magnitude and polarity to the common fault locate line 30. This in turn actuates the oscillator 72. If errors are being simultaneously detected by the error monitor 70, this will result in actuation of the relay 23 through the contacts 71–1 which in turn will loop the signal from the subterminal 12 back along the transmission line 26 to the main terminal 10. However, if the incoming signal on the transmission line 22 is substantially free of errors, no looping will take place.

To test a specific one of the 48 line repeaters 1E . . . 24W, a test signal having an audio component of one of the frequencies $f_1 \ldots f_{12}$ is applied from the generator 34 to the transmission line 22 by actuation of the transfer contacts 21. Concurrently, voltage of a selected magnitude and polarity is applied from the d-c power supply 33 to the common fault locate line 30. The magnitude of the powering voltage determines whether the low powering voltage frequency selective filter circuits 1L . . . 13L, or the high powering voltage frequency selective filter circuits 1H . . . 12H will be actuated. The polarity of the powering voltage determines which of the two transmission lines 22 or 26 will be monitored. For instance, if it is desired to test the line repeater 11E, a test signal having a frequency $f_{12}$ would be applied to the transmission line 22 from the generator 34. Concurrently, a d-c powering voltage from the supply 33 of 45V with positive on the R lead would be applied to the common fault locate line 30. This in turn would forward bias the transistor 62 via the diode 63 and the resistor 64 would connect the output of the line repeater 11E to the transistor 47. The output of the transistor 47 would be connected through transformer 48 and the audio filter 53 whose output is connected via the common fault locate line 30 through the transformer 31 to the fault locate measure set 32. The format of the test signal could be essentially the same as that described in the above-mentioned patent to Mayo. Thus, this arrangement provides unique testing of a particular line repeater in a transmission system using only one pair of wires for the common fault locate line where only a limited number of test frequencies are available.

What is claimed is:

1. A fault locating system for a bipolar digital transmission system including first and second transmission lines having pairs of line repeaters serially connected in opposite directions at adjacent intervals therealong;

a frequency selective filter circuit at each location connected to the outputs of the pair of line repeaters for monitoring the performance thereof, the circuits being divided into two groups which are responsive to corresponding test frequencies, each of the frequencies being unique within a group;

means for transmitting a bipolar test signal along said first transmission line having recurrent unipolar pulses at one of said test frequencies;

a common fault locate line connected to a signal output of each of said frequency selective filter circuits;

means for powering said circuits from said common fault locate line;

each of said frequency selective filter circuits including a control means to actuate the circuits in one group only when the powering voltage is below a selected value and to actuate the circuits in the other group only when the powering voltage is above said selected value;

each of said frequency selective circuits also including means for selecting the output of one or the other of the pair of line repeaters connected thereto in response to the d-c polarity of the powering voltage connected to said common fault locate line;

means for detecting errors in the bipolar signal being received at the end of said first transmission line;

means for detecting the d-c powering voltage on the common fault locate line; and means responsive to the error detector and the voltage detector for routing the output of the first transmission line back to the input of the second transmission line.

2. A fault locating system for a digital transmission system including first and second transmission lines having pairs of line repeaters serially connected in opposite directions at adjacent intervals along said lines, said system comprising:

a frequency selective filter circuit connected to the output of each of said line repeaters for monitoring the performance thereof, the circuits being divided into two groups which are responsive to corresponding test frequencies, each of the frequencies being unique within a group;

means for transmitting a test signal along said transmission line at one of said test frequencies;

a common fault locate line connected to a signal output of each of said frequency selective filter circuits;

means for powering said circuits from said common fault locate line; and means responsive to the detection of a predetermined number of errors on the incoming signal from the first transmission line and to the detection of power on said common fault locate line for gating the signal onto the input of the second transmission line;

whereby testing of either of said lines can be accomplished from one terminal of said lines.

3. A fault locating system as defined in claim 2 in which:

each of said frequency selective filter circuits includes control means to actuate the circuits in one group only when the powering voltage is below a selected value and to actuate the circuits in the other group only when the powering voltage is above said selected value; and each filter circuit additionally includes means for selecting the output of one or the other of the two line repeaters connected thereto in response to the d-c polarity of the powering voltage connected to said common fault locate line.

* * * * *